(12) United States Patent
Kirkpatrick

(10) Patent No.: US 8,418,541 B2
(45) Date of Patent: Apr. 16, 2013

(54) DYNAMOMETER FREE OF OFF-AXIS LOADING

(76) Inventor: William E. Kirkpatrick, Bozeman, MT (US)

( * ) Notice: Subject to any disclaimer, the term of this patent is extended or adjusted under 35 U.S.C. 154(b) by 383 days.

(21) Appl. No.: 12/746,000

(22) PCT Filed: Dec. 3, 2008

(86) PCT No.: PCT/US2008/085360
§ 371 (c)(1),
(2), (4) Date: Jun. 3, 2010

(87) PCT Pub. No.: WO2009/073697
PCT Pub. Date: Jun. 11, 2009

(65) Prior Publication Data
US 2010/0251832 A1    Oct. 7, 2010

Related U.S. Application Data

(60) Provisional application No. 61/005,360, filed on Dec. 4, 2007, provisional application No. 61/005,227, filed on Dec. 4, 2007.

(51) Int. Cl.
*G01M 15/02* (2006.01)
(52) U.S. Cl.
USPC ........................................... 73/116.05
(58) Field of Classification Search ........... 73/116.05, 73/116.06, 116.07, 116.08, 116.09, 116.11
See application file for complete search history.

(56) References Cited

U.S. PATENT DOCUMENTS

| | | | |
|---|---|---|---|
| 4,062,233 A | 12/1977 | Bonomo | |
| 4,077,255 A | 3/1978 | Murakami | |
| 4,182,166 A | 1/1980 | Herr, Jr. | |
| 4,468,955 A | 9/1984 | Yamasaki et al. | |
| 4,478,090 A | 10/1984 | McFarland | |
| 4,635,472 A | 1/1987 | Scourtes | |
| 5,063,733 A | 11/1991 | Jackson et al. | |
| 5,154,076 A | 10/1992 | Wilson et al. | |
| 5,337,600 A | 8/1994 | Kaneko et al. | |
| 5,447,060 A | 9/1995 | Smith et al. | |
| 5,663,494 A | 9/1997 | Clayton et al. | |
| 5,861,552 A | 1/1999 | Clayton et al. | |
| 6,439,037 B1 | 8/2002 | D'Angelo | |
| 6,860,145 B2 | 3/2005 | Bergst et al. | |
| 2009/0193909 A1* | 8/2009 | Ichige et al. | 73/862.08 |
| 2012/0060596 A1* | 3/2012 | Ichige et al. | 73/116.06 |

FOREIGN PATENT DOCUMENTS

| | | |
|---|---|---|
| JP | 58090135 A | 5/1983 |
| JP | 7318443 A | 12/1995 |
| JP | 9015105 A | 1/1997 |
| JP | 11014489 A | 1/1999 |
| JP | 2002022572 A | 1/2002 |
| JP | 2005147933 A | 6/2005 |

* cited by examiner

*Primary Examiner* — Eric S McCall
(74) *Attorney, Agent, or Firm* — MacMillan, Sobauski & Todd, LLC

(57) ABSTRACT

A dynamometer includes a roller that is rotatably mounted upon a shaft with the shaft being rotatably mounted upon a support that carries the weight of the roller, the dynamometer also having a shear beam load cell disposed within the roller with a first end secured adjacent to an inner surface of the roller and a second end attached to the shaft to provide the sole structural connection between the roller and the shaft.

20 Claims, 13 Drawing Sheets

DYNAMOMETER FREE OF OFF-AXIS LOADING

CROSS-REFERENCE TO RELATED APPLICATIONS

This application is the National Phase of International Application PCT/US2008/085360 filed Dec. 3, 2008 which designated the U.S. and that International Application was published in English under PCT Article 21(2) on Jun. 11, 2009 as International Publication Number WO 2009/073697 A2. PCT/US2008/085360 claims priority to U.S. Provisional Application No. 61/005,360, filed Dec. 4, 2007. Thus, the subject nonprovisional application claims priority to U.S. Provisional Application No. 61/005,227, filed Dec. 4, 2007. The disclosures of both applications are incorporated herein by reference.

BACKGROUND OF THE INVENTION

This invention relates in general to machines used to measure torque and power and in particular to dynamometers.

Dynamometers have been used many years in the vehicle manufacturing industry for testing vehicles in place as distinguished from road testing. Vehicle dynamometers are used in various testing operations. One principal use is that of measuring the torque and horsepower output of a vehicle. Another principal use is that of simulating the road load forces and the inertia forces acting upon a vehicle during actual operation of the vehicle on a roadway. In both applications, the dynamometer must be capable of measuring roll torque with a high degree of accuracy.

A typical chassis roll dynamometer comprises at least one dynamometer roller that is rotatably mounted in a stationary frame and that supports one driving wheel of a vehicle to be tested. The roller is typically of large diameter, several times that of the supported vehicle wheel. There is driving engagement between the vehicle wheel and the roller by reason of the traction forces of the wheel such that the vehicle wheel may drive the roller, or, with some types of dynamometer, the roller may drive the vehicle, depending upon the test being conducted. The dynamometer also includes a device for developing a braking torque between the roller and dynamometer frame. The actual device for developing the braking torque may be frictional, hydraulic or electromagnetic, such as a motor/generator brake or an eddy current brake. The dynamometer system also typically includes an apparatus for simulating road load forces acting upon the vehicle wheel and for simulating inertia forces acting upon the vehicle during acceleration and deceleration. The road load forces include rolling friction and windage. The apparatus for simulating road load forces may comprise a motor coupled with the roll through a roll shaft and a controller for controlling energization of the motor in accordance with the simulation or testing being conducted. In some systems, a flywheel is coupled with the roll shaft for simulating inertia. The motor of the dynamometer system is sometimes referred to as a power exchange unit because it may be operated to either apply power to the vehicle wheel or absorb power from the vehicle wheel through the roll. The motor may operated as either a torque generating or absorbing device and may be either a DC or an AC motor.

In a dynamometer system of the type described above, it is common practice to provide instrumentation for the measurement of the torque output and rotational speed of the vehicle wheel. The torque is typically measured by a torque transducer connected in the drive train of the dynamometer with the transducer providing a roll torque signal to an electronic dynamometer controller. Wheel speed, which is the same as roller speed, is typically measured by a shaft encoder suitably connected with the roll shaft of the dynamometer for supplying a rotational wheel speed signal to the dynamometer controller. The dynamometer controller typically includes a computer and monitors the dynamometer output torque and rotational wheel speed while controlling the applied load torque.

A longstanding problem in achieving a high degree of accuracy in vehicle simulation and testing is that of providing accurate compensation for torque measurement errors caused by friction in the roller shaft bearings due to applied load and viscosity friction. It has been a common practice in chassis roller dynamometers to install the torque transducer in the driven shaft between a shaft bearing and the load. In this arrangement, the torque transducer does not produce an accurate measurement of the torque applied to or absorbed from the roller because it is influenced by the bearing torque. In the prior art, there have been attempts to provide compensation for the measurement errors arising from bearing friction. Such prior art attempts have disadvantages in that the torque measurement errors are not precisely compensated or eliminated and a complex and costly system is required. Also, changes in oil viscosity, applied load and tractive effort forces will influence bearing friction torques. Accordingly, it would be desirable to provide a dynamometer that minimizes such losses.

BRIEF SUMMARY OF THE INVENTION

This invention relates to dynamometers.

The present invention contemplates a dynamometer that includes at least one support with a roller shaft rotatably mounted upon the support. The dynamometer also includes at least one hollow annular roller rotatably mounted upon the roller shaft, with the support carrying the weight of the roller, and at least one shear beam load cell disposed within the roller, the load cell having a first end secured adjacent to an inner surface of the roller and a second end attached to the roller shaft to provide the sole structural connection between the roller and the shaft. The dynamometer further includes at least one rotatable load driven by the roller shaft, the load operative to cause the load cell to generate a signal that is a function of a torque that is being applied to the roller.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
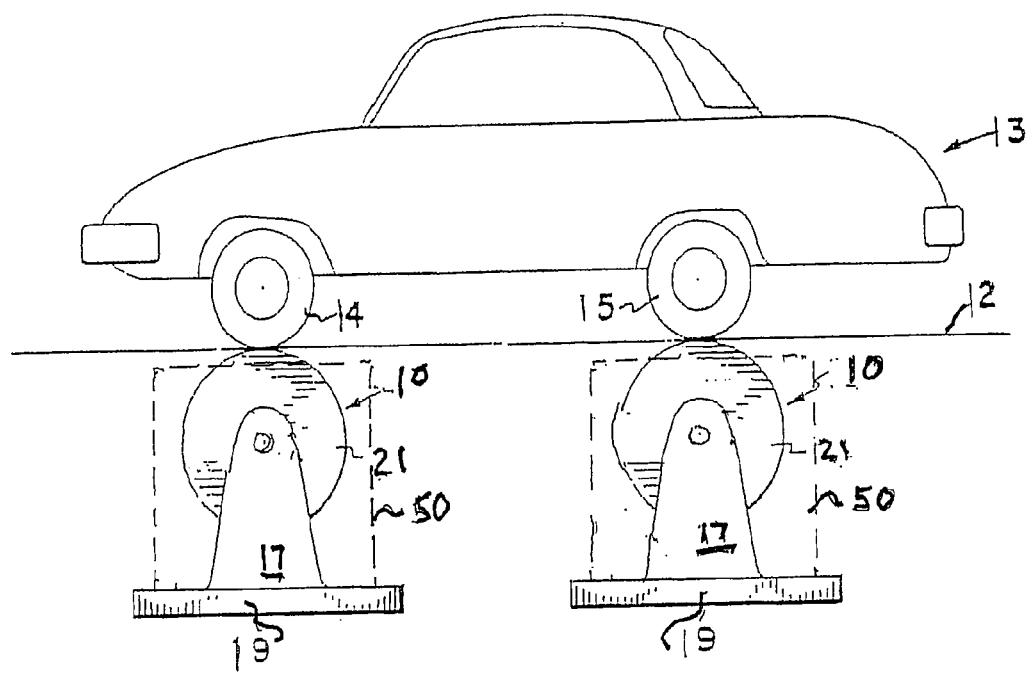
FIG. 1 is a diagrammatic, side elevation view of a chassis dynamometer adapted to test a two-wheel or four-wheel drive vehicle in accordance with the invention.
Figure 2:
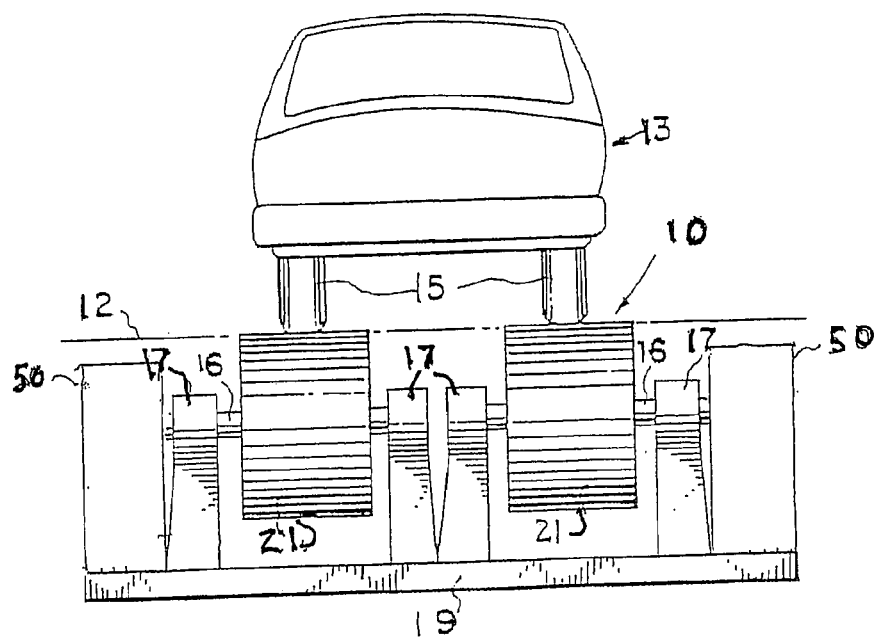
FIG. 2 is an end elevation view of the dynamometer shown in FIG. 1.

Referring now to the drawings, there is illustrated in FIGS. 1 and 2 a chassis dynamometer constructed in accordance with the preferred embodiment of the invention that includes a number of roller load testing units 10 all of which are alike and each of which is mounted in a pit or chamber lying below a load supporting surface 12 over which a vehicle 13 may be driven. The vehicle 13 has four ground engageable wheels comprising two steerable front wheels 14 and two rear wheels 15. For purposes of illustration either the front wheels and/or the rear wheels may be the driving or propulsion wheels. For a typical four-wheel vehicle, regardless of whether it is equipped with a two or four-wheel drive transmission, it is preferred that there be one roller load testing unit 10 for each wheel. The roller load testing units 10 are so arranged as to correspond to the front-to-rear and the side-to-side spacing of the wheels 14 and 15, thereby enabling all four wheels to be in drive transmitting engagement with the respective testing units simultaneously. While four testing units 10 are shown in FIGS. 1 and 2, it will be appreciated that the invention may also be practiced with more or less testing units. The number of testing units 10 would be selected to match the vehicle being tested. Thus, for testing a motorcycle that has a single driven wheel, only one testing unit 10 would be required (not shown). In a like manner, a two wheel drive unit may also be tested by providing only two test units 10 (not shown).

Preferably, the surface 12 has openings formed therein through which the roller load testing units 10 project, and suitable stabilizing rollers or the like (not shown) are provided to ensure stability of the vehicle on the roller testing units, in a conventional manner. Alternately, one or more straps with each strap having one end connected to the surface 12 and the other end connected to the vehicle being tested (not shown) may be utilized to stabilize the vehicle.

Figure 3:
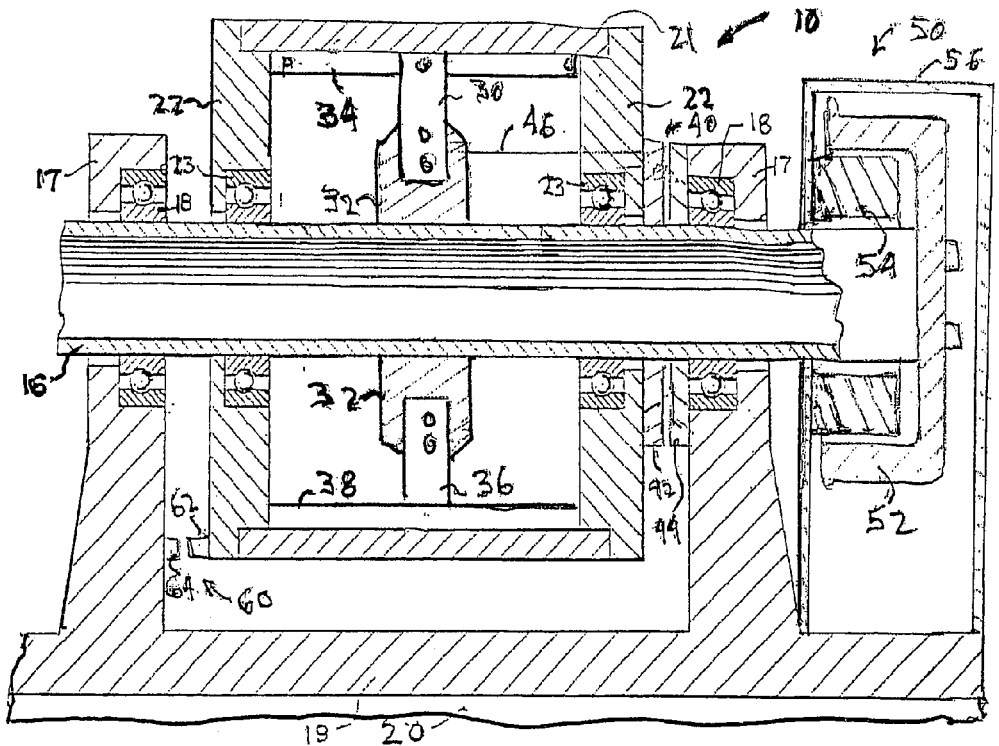
FIG. 3 is an enlarged sectional view through one of the load testing units shown in FIG. 1.

As is best shown in FIG. 3, each of the roller load testing units 10 includes a shaft 16 independent of all of the other test unit shafts and journaled at its opposite ends in stationary supports 17 by means of outer bearings 18. While the shaft 16 is shown as being hollow in FIG. 3, it will be appreciated that the invention also may be practiced with a solid shaft (not shown). The supports 17 extend upwardly from a base 19 which is fixed to a suitable floor 20 below the surface 12. Encircling each shaft 16 is a hollow annular drum, or roller, 21 having end walls 22 provided with inner bearings 23 for journaling the drum on the shaft 16. Thus, the roller 21 is completely supported upon the shaft 16 by the pair of inner bearings 23. While roller support bearings 23 are shown in FIG. 3, it will be appreciated that the invention also may be practiced with any low friction device that supports the roller 21 and would allow the roller 21 to turn freely about the shaft 16. Similarly, other low friction devices than the roller bearings shown in FIG. 3 may be utilized for the outer bearings 18.

Figure 4:
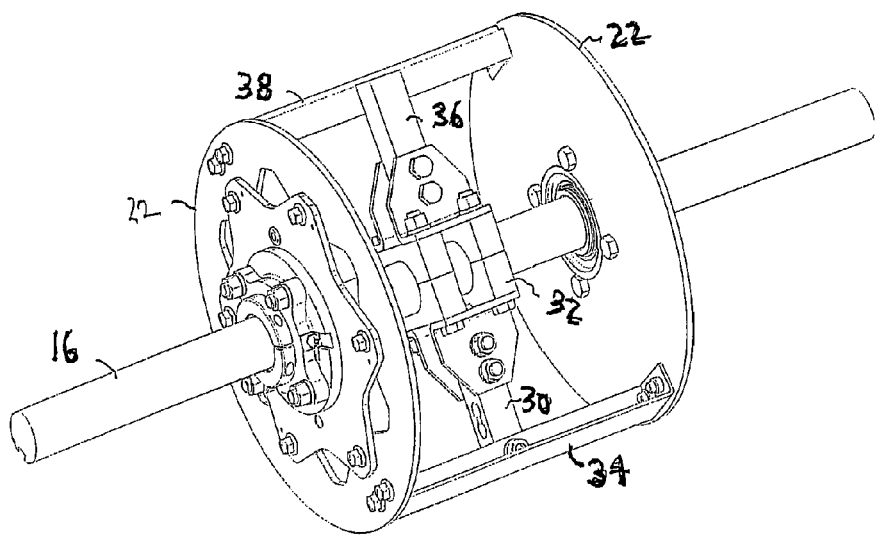
FIG. 4 is perspective view of the interior of a dynamometer roller that is shown in FIG. 1.

A conventional shear beam load cell 30 is disposed between the inner surface of each roller 21 and the shaft 16. As best seen in FIG. 4, the inner end of the load cell 30 is attached to a collar 32 that extends around, and is secured to, the shaft 16, while the outer end of the load cell is attached to a first cross arm 34 that is adjacent to the inner surface of the roller 21. The first cross arm 34 is formed from a piece of angle and has each of its ends secured to one of the roller end walls 22. Alternately, the outer end of the load cell 30 may be attached to a bracket (not shown) that is welded or bolted to the inner surface of the roller 21. As shown in FIG. 4, the load cell 30 is secured to the collar 32 and cross arm 34 with threaded fasteners, such as screws or nut and bolt combinations, to allow easy replacement of the load cell 30 should the unit fail.

The load cell 30, which is a sealed unit, is calibrated and temperature compensated by the load cell supplier, and consists of a beam upon which are bonded a set of strain gauges (not shown). In the embodiment shown, four stain gages are utilized in each load cell to obtain maximum sensitivity and temperature compensation. It is contemplated that, upon a shear force being applied to the beam, two of the strain gages would be placed in tension while the other two would be placed in compression. The strain gages are connected to form a conventional resistive bridge circuit (not shown) with a constant voltage applied to a pair of opposite input nodes and a differential output voltage sensed across the other pair of nodes. Additional resistive components, if needed, may be added to the bridge circuit.

A balance counterweight 36 is mounted between the collar 32 and a second cross arm 38 that is adjacent to inner roller surface opposite from the load cell 30. The second cross arm 38 also is formed from a piece of angle and has each of its ends secured to one of the roller end walls 22. As shown in FIGS. 3 and 4, the outer end of the counterweight 36 is not attached to the second cross arm 38. The counterweight 36 and second cross arm 38 are intended to balance the weight of the load cell 30 and the first cross arm 34 to prevent the generation of vibrations during operation of the test unit 10. The counterweight 36 is illustrated as appearing the same as the load cell 30; however, other configurations of the counterweight also may be utilized. For example, the counterweight may optionally be increased and the second cross arm omitted (not shown). Because only the load cell 30 is attached to the collar 32 and the first cross arm 34, the load cell provides the sole structural connection between the drum 21 and the shaft 16, thus assuring that the total torque generated by the vehicle being tested is applied to and measured by the load cell 30. However, as explained above, the roller 21 is supported upon the shaft 16 by the pair of inner bearings 23.

The roller test unit 10 also includes a rotary transformer 40 that is mounted on the right side of FIG. 3 between one end 22 of the roller 21 and one of the supports 17. The rotary transformer 40 includes a rotating member 42 that is mounted upon the roller end 22 and therefore rotates with the roller 21 and a stationary member 44 that is mounted upon the support 17 that is to the right in FIG. 3. The rotating and stationary members 42 and 44 are separated by a small air gap that allows the former to rotate relative to the latter. The rotary transformer 40 is operative to transfer electrical signals between the rotating member 42 and the stationary member 44. The bridge circuit for the strain gages of the load cell 30 is connected by corresponding wires 46 to the rotating member 42 of the rotary transformer 40. While a single line labeled 46 is shown in FIG. 3, it will appreciated that a plurality of wires will connect the load cell bridge circuit to the rotating member 42 of the rotary transformer 40. Thus two wires would supply a fixed voltage to the input nodes of the bridge circuit while another two wires would be attached to the output nodes of the bridge circuit. Additionally, it will be understood that a schematic presentation of the wires 46 is shown and that the actual wires may follow a path other than that illustrated in FIG. 3.

Figure 5:
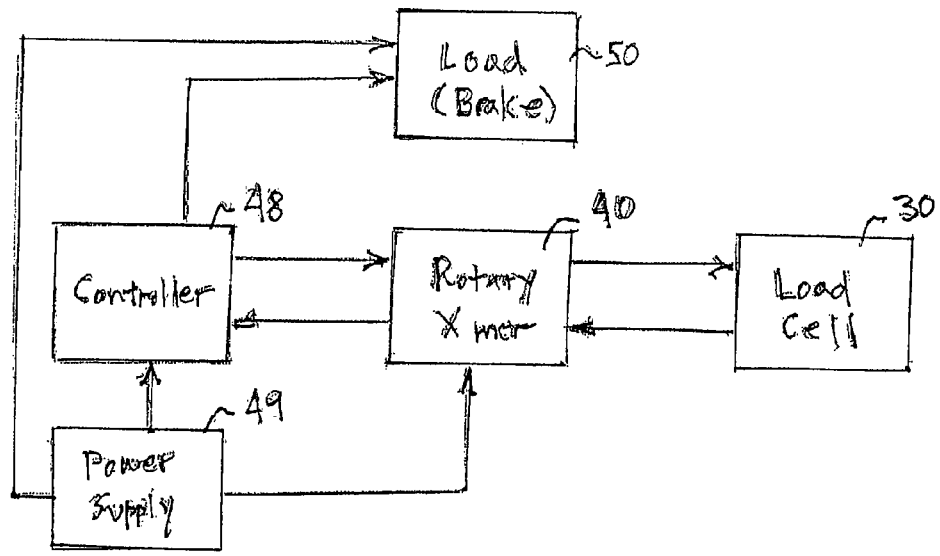
FIG. 5 is a block diagram illustrating the control of the dynamometer shown in FIG. 1.

As shown in FIG. 5 the stationary member 44 also is connected to a test unit controller 48 and a power supply 49. The test unit controller 48 includes a computer or microprocessor (not shown) and an algorithm for controlling the operation of the test unit 10. The computer or microprocessor also is operative to convert the output signals received from the sensing components of the test unit 10 into output data. Additionally, the controller 48 includes output displays for the operator and a memory unit for storing the output data. Finally, signal conditioning circuitry for the load cell output signals may be included in the controller 48. The invention contemplates that the rotary transformer 40 transfers signals generated by the load cell 30 from within the roller 21 to the test unit controller 48 while also transferring power from the power supply 49 to the load cell 30, as illustrated by the arrows in FIG. 5. While the embodiment of the invention shown in FIG. 3 utilizes a rotary transformer 40, it will be appreciated that the invention also may be practiced with other devices for transferring electrical signals, to include, for example, a wireless connection or an optical coding and decoding device (not shown).

Loading for the roller test unit 10 is provided in the embodiment of the invention shown in FIG. 3 by an eddy current brake 50 that is located at the right end of the test unit in FIG. 3 and shown in phantom in FIG. 1. As shown the eddy current brake 50 includes a conventional brake drum 52 that is attached to the end of the shaft 16. A set of stationary iron cores 54 that are wound with coils (not shown) are disposed within the brake drum 52. The brake drum/coil assembly is disposed within a louvered housing 56 with the iron cores 54 secured to the housing. While only one eddy current brake 50 is shown in the figures, the invention also contemplates that a second eddy current brake (not shown) may be mounted upon the opposite end of the shaft 16.

During operation of the test unit 10, an electric current is applied to the brake coils wound upon the iron cores 54 to create a non-uniform magnetic field. The electric current is supplied by the power supply 49 and controlled by the test unit controller 48, as illustrated by the arrows shown in FIG. 5. The non-uniform magnetic field in turn induces eddy voltages within the rotating brake drum 52. The eddy voltages cause eddy currents to flow within the brake drum 54. The resulting eddy currents undergo Lorentz forces within the magnetic field that act to slow the rotation of the brake drum and, accordingly, the attached shaft 16.

An eddy current brake 50 offers very quick load control, moderate inertia, and high specific load capacity, especially in the lower RPM working ranges of most industrial type engines. For applications that do not require stall speed loading, an air-cooled eddy current absorber is usually the most cost effective electric absorber available. Eddy current brakes include self-cooled rotors that do not require an external water supply or a resistor banks while costing less than planetary driven water brakes. Thus, the eddy current brake allows far more design flexibility than hydraulic pumps.

While the invention has been illustrated and described as utilizing an eddy current brake to load the test unit 10, it will be appreciated that other conventional dynamometer loads also may be utilized, such as, for example, an electric motor or generator, or other devices. Additionally, water cooled eddy current absorbers (not shown) could be utilized as loads for the test unit 10. Although more expensive than air cooled systems, water cooled eddy current absorbers have lower inertia and temperature independent load ratings. Furthermore, as described below, a fan or propeller may be used as a load for embodiments of the invention intended to be used for low power devices, such as, for example, mopeds.

It is noted that prior art dynamometers typically utilize a pivotally mounted eddy current brake to stop rotation of the roller. Such prior art dynamometers require a separate load cell that measures the braking force applied to the roller. The braking force is then combined with the dynamometer output to determine the actual output. The present invention does not require separate measurement of the braking force, thus simplifying the operation of the dynamometer while reducing the cost of the device.

A speed encoder 60 is mechanically coupled to left end of the rotor 21 in FIG. 3. The speed encoder 60 includes a movable member 62 that is mounted upon outer circumference of the left rotor end 22 and a stationary member 64 that is mounted upon the support 17 that is to the left of FIG. 3. The stationary member 64 is electrically connected to the test unit controller. As the roller 21 rotates, the movable member 62 co-operates with the stationary member 64 to generate a fluctuating signal that is a function of the rotor rotational speed. The movable and stationary members 62 and 64 are separated by a small air gap that allows the former to rotate relative to the latter. Alternately, the speed encoder may be integrated into the rotary transformer (not shown).

The invention also contemplates that an alternator for generating power for the eddy current brake 50 and a hydraulic pump connected to a propeller to provide forced air matching vehicle speed may be attached by a belt, or other drive device, to the test unit 10 (not shown).

The operation of the test units 10 will now be described. As described above, the shafts 16 are freely rotatable relative to their supports 17 and the drums 21 are freely rotatable relative to their respective shafts 16. To limit or restrict rotation of the shafts 16 power is provided to the eddy current brakes 50 mounted upon the ends of the shafts 16. The eddy current brakes 50 retard, or load, the shafts 16, causing the vehicle wheels driving the roller 21 to produce a torque upon the beam load cell 30 contained in each of the test units 10. The amount of torque produced is sensed by the strain gauges included in the load cell 30 and transmitted through the rotary transformer 40 to the test unit controller. The loads on the test units 10 may be increased by increasing the current, and hence the power, provided to the eddy current brakes 50. The speed encoders 60 provide the rotational speed of each of the rollers 21 to the test unit controller. The controller computer, which, as described above, includes the operating algorithm, is operative to calculate the output power of the vehicle being tested as the sum of the products of the generated torque and the rotational rotor speed from each of the test units 10.

One advantage of the present invention is the use of a conventional load cell which is already calibrated and temperature compensated. The inventor believes that the present invention also provides the following advantages:

I. Accuracy—The only losses not measured by the present invention are any wind drag on the roller, roller inertial losses under acceleration or deceleration, and any friction of the roller support bearings. For example, one prior art dynamometer has 12 bearings between the wheel and the load cell: at least two to support the roller(s), two universal joints with four needle bearings each, and two shaft bearings in the eddy current brake. In addition, the brake disks on the prior art dynamometer have integral fans for self-cooling which attach directly to the brake shaft. Thus, any braking caused by the air movement is not measured. The largest of the above listed loss parameters not directly measured with the present invention is the roller inertia loss which may be easily calculated by knowing the acceleration/deceleration. Because the roller support bearings 23 do not actually turn, friction losses are minimal and can be reduced even further by applying special lubricants to the inner bearings 18.

II. Cost Reduction—The same reasons given above affect the cost of the test unit 10, as the size and complexity of a dynamometer are be greatly reduced. While an eddy current brake has been shown as the preferred embodiment, any form of brake, such as a friction, hydraulic (or water), or electric (AC or DC generator) can be mounted directly to the test unit chassis. As shown in FIG. 3, the drum 52 of the eddy current brake 50 attaches directly to the dynamometer shaft 16 while its stator 54 mounts directly to the chassis by means of the housing 56. Additionally, as will be described and illustrated below, the invention also contemplates utilizing at least one fan and/or a weight to simulate loading on the test vehicle.

III. Size—While the embodiment of the invention has been illustrated and described above with the test unit 10 placed within a pit; the small physical size of the test unit 10 uses less space than a prior art dynamometer and thus does not actually require a dedicated pit. Indeed, as described and illustrated below, the invention also contemplates enclosing the dynamometer roller within a housing that is placed upon the load supporting surface, thus eliminating the pit. Elimination of the pit significantly reduces installation costs. No electrical service or hydraulics need be professionally installed as the unit is self contained. Options such as cooling and exhaust fans can be driven directly from the dynamometer not requiring separate motors and controllers. Due to the simplicity of the test unit 10, maintenance costs are nearly eliminated. Because no additional energy is required, no operational costs beyond maintenance are incurred. Shipping costs for the test unit 10 are lower than for prior art dynamometers due to the lower weight and smaller size of the test unit 10.

IV. Versatility—Besides the previously mentioned options, a portion of the vehicle energy may optionally be sent back onto the electrical grid (not shown), which provides a source of income from the energy expended by the prime mover. Additionally, the rollers may be driven electrically or hydraulically (not shown) to simulate rolling downhill or accurate deceleration. Because each wheel has its own load cell, additional drive train characteristics can be measured, such as, for example, powered differential operation, operation of automatic braking systems, such as anti-lock brake systems, and operation of traction control systems.

V. Temperature.—Friction between the tire and roller heats both the tire and the roller during testing. In prior art dynamometer designs that include strain gages placed directly on the spokes or supporting structure of the roller, any expansion of the roller and supporting structure due to heating also stretches the strain gages. The heat induced stretching of the strain gages appears as an additional load. Temperature compensation techniques, such as dual strain gages with one strain gage in tension and the other strain gage in compression, help but do not eliminate this problem. The use of independently manufactured load cell assemblies in the present invention provides for maximum accuracy with temperature compensation techniques.

VI. Off-Axis Loading.—The signal from a strain gage will include a response to any strain on the gage, regardless of the direction of the strain. Placing the strain gage directly on the spoke or supporting structure, as is typically done in prior art dynamometers, makes both the gage placement and machining of that structure very critical. Even with extreme precautions, certain "off-axis" loads cannot be eliminated, making this a very significant factor. Additionally, vehicle weight may affect the performance of a prior art dynamometer because, as the roller is pushed down by the weight of the vehicle, the strain gage directly under the vehicle wheel will be under compression while stain gage that is furthest away from the vehicle wheel will be in tension. Furthermore, wheel placement affects the performance of prior art dynamometers. If the wheel is not perfectly centered on the roller, the roller is subject to a twisting moment, causing the force on one side of the roller to be greater than the force on the other side of the roller. Even if spokes supporting the roller are centrally located, the spokes that carry strain gages are subject to torsion. As the roller spins it is subject to centrifugal forces that strain the supporting structure, introducing error in the stain gages. With the present invention, off-axis loading is virtually non-existent because all forces except the actual torque are directed through the roller ends 22 and their supporting bearings 23. Side forces, centrifugal forces (other than on the load cell itself), twisting forces, and vehicle weight forces are all directed through the roller ends 22 and supporting bearings 23, not through the load cell and its strain gages.

VII. Hysteresis/Sensitivity—Any metal is subject to some hysteresis. If stressed in one direction, the metal will not return to precisely the same position as it would if stressed the opposite direction and released. This phenomenon is commonly called toggling. Increasing the size of the metal can reduce this hysteresis but any increase in size in turn reduces the sensitivity to strain-straining the gage less and thus reducing its output signal. Sensitivity is further reduced for any supporting structure not measured by a strain gage. The supporting structure must be strong enough to not fail under the most extreme conditions, making sensitivity to strain and, thus, signal output extremely small and difficult to measure. With the present invention, the ends 22 supporting the roller 21 support the vehicle weight and may be constructed with a much higher safety factor without regard to metal hysteresis and signal sensitivity. Only the load cell itself must be manufactured to reduce hysteresis while maintaining adequate signal sensitivity. If the load cell is subjected to a damaging force, only the load cell must be replaced, not the entire roller structure.

Additionally, it is contemplated that the forward test units may be mounted upon pivots, allowing them to rotate with steering. The invention also may be practiced as a motorcycle dynamometer that would be small enough to be mounted upon retractable casters for mobility and provided with a hinged ramp for loading a test motorcycle onto the roller (not shown). For movement of the test unit, the ramp would be moved to a raised position, the casters would be lowered and the test unit could be rolled out of the way or to a new location.

In the case of multiple wheeled vehicles, the roller speeds could be synchronized utilizing additional hydraulic pump/motors. For emissions testing, an additional electric or hydraulic motor (not shown) could be included in the test unit to drive the roller to simulate downhill driving or inertial effects during deceleration.

Furthermore, the invention contemplates utilizing more than one roller per wheel (not shown). This would be similar to many prior art automotive dynamometers that have two rollers per wheel so the vehicle does not have to be restrained using straps. The two rollers would be mechanically linked together but have a load cell inside each roller.

While the invention has been illustrated and described above as utilizing a shear beam load cell; it will be appreciated that other devices also may be utilized to measure the shear forces generated by the test vehicle. However, the inventor believes that use of a shear beam load cell provides proven durability, availability, and cost effectiveness.

Figure 6:
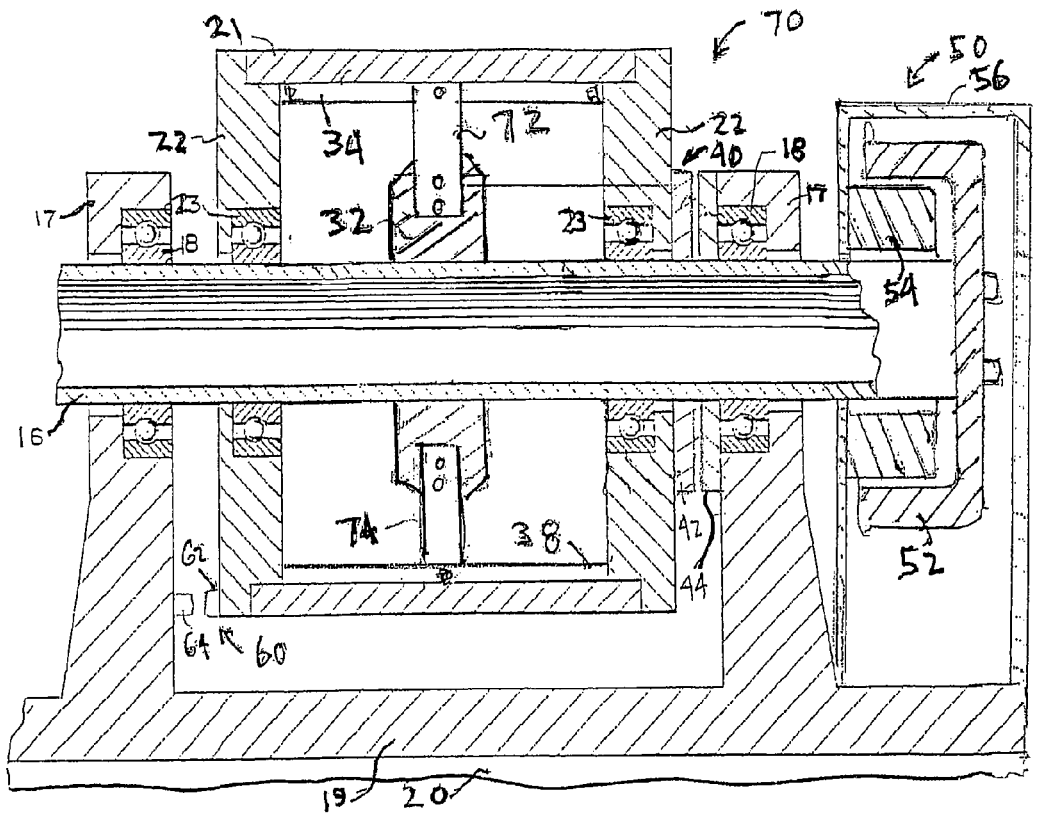
FIG. 6 illustrates an alternate embodiment of the load testing unit shown in FIG. 3.

An alternate embodiment 70 of the invention is illustrated in FIG. 6, where components that are similar to components shown in FIG. 3 have the same numerical identifiers. As shown in FIG. 6, the test unit 70 has a pair of single shear beam load cells 72 and 74 disposed within the roller 21. The beam of each of the load cells 72 and 74 has an outer end attached a cross arm 34 and 38, respectively, that is adjacent to the inner surface of the roller 21. Additionally each of the load cells 72 and 74 has inner end attached to the collar 32 that is again secured to the shaft 16. As described above, the alternate embodiment 70 includes one or two eddy current brakes 50 (one shown) for loading of the test unit 70. The two load cells 72 and 74 are only structural connections between the roller 21 and the shaft thus assuring that the total torque generated by the vehicle being tested is applied to and measured by the load cells 72 and 74. However, as explained above, the roller 21 is supported upon the shaft 16 by the pair of inner bearings 23. Because the total torque is divided between the load cells 72 and 74, the alternate embodiment 70 may be utilized for testing of more powerful vehicles than the embodiment 10 shown in FIG. 3. Alternately, the load cells 72 and 74 may have smaller ratings than the load cell 30 included in the the embodiment 10 shown in FIG. 3. In the embodiment shown in FIG. 6, the outputs of the two load cells 72 and 74 are combined to produce a net output for the test unit 70.

Figure 7:
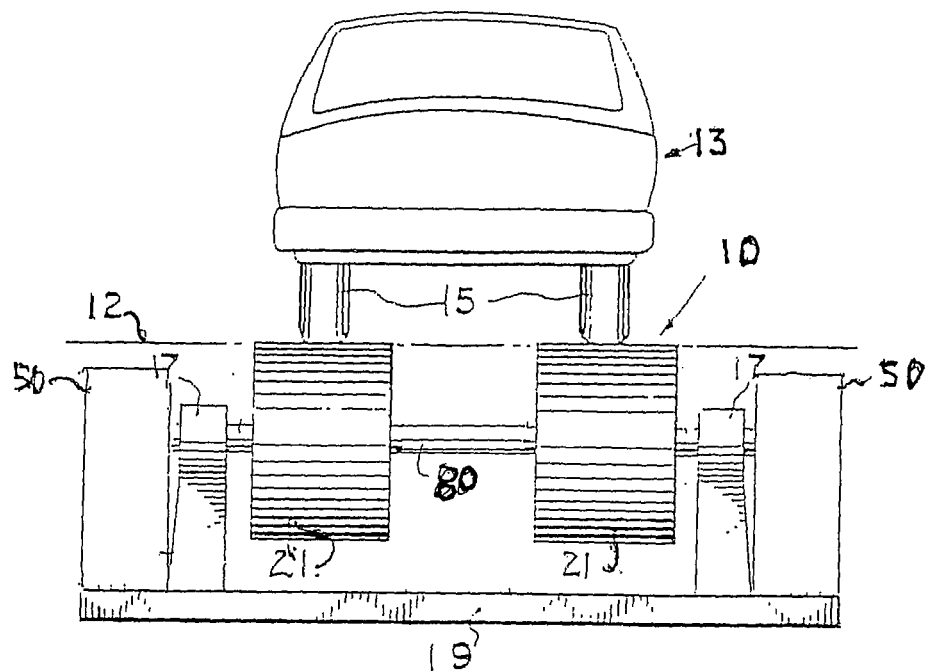
FIG. 7 illustrates an alternate embodiment of the dynamometer shown in FIG. 2 having two load testing units mounted upon a single shaft.

Another alternate embodiment of the invention is illustrated in FIG. 7, where components that are similar to components shown in the other drawings have the same numerical identifiers. In FIG. 7, two rollers 21 are mounted upon a common shaft 80. While the shaft 80 is shown as being supported only on the outer ends, the invention also contemplates providing a middle support (not shown), if needed, for testing heavier vehicles. The rotary transformer and speed encoder described above would be located between the outer end of each of the rollers 21 and the corresponding support 17 (not shown). The configuration shown in FIG. 7 provides a significant cost reduction by eliminating hydraulic couplings needed to synchronize the speeds of the individual rollers. The test units may each have one load cell, as illustrated in FIG. 3, or two load cells, as illustrated in FIG. 6.

Figure 8:
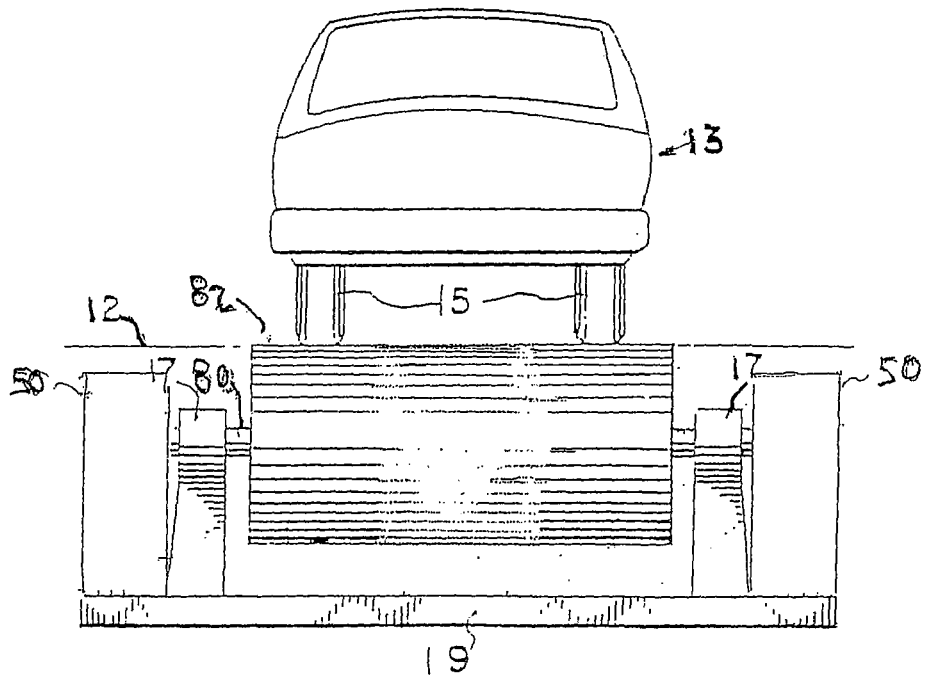
FIG. 8 illustrates another alternate embodiment of the dynamometer shown in FIG. 2 having a single roller mounted upon a single shaft.

Another alternate embodiment of the invention is illustrated in FIG. 8, where components that are similar to components shown in the other drawings have the same numerical identifiers. In FIG. 8, a single long roller 82 is mounted upon a common shaft 80 and supports both driven wheels of the test vehicle 13. This embodiment would be useful in testing small vehicles, such as, for example all terrain vehicles.

Figure 9:
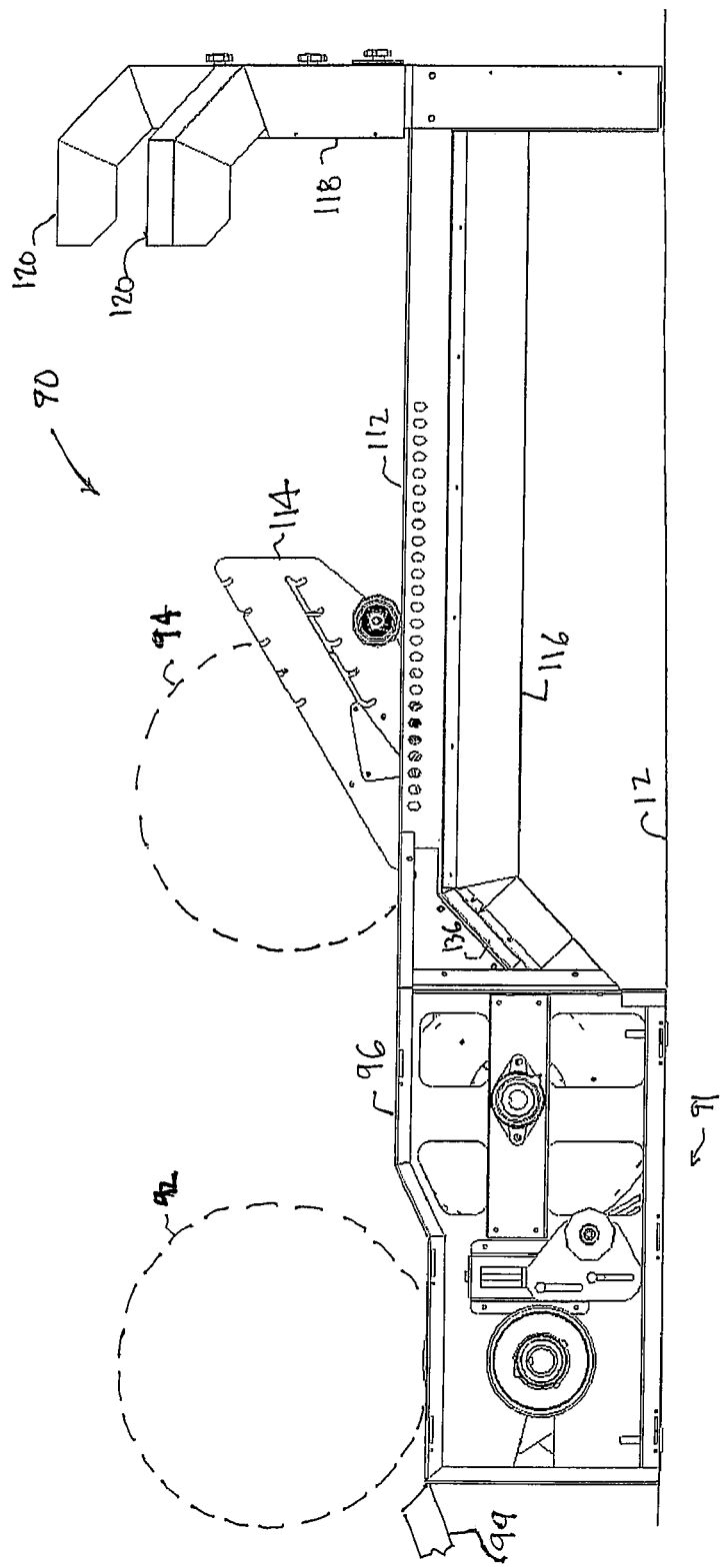
FIG. 9 illustrates a dynamometer test system in accordance with the present invention.
Figure 9A:
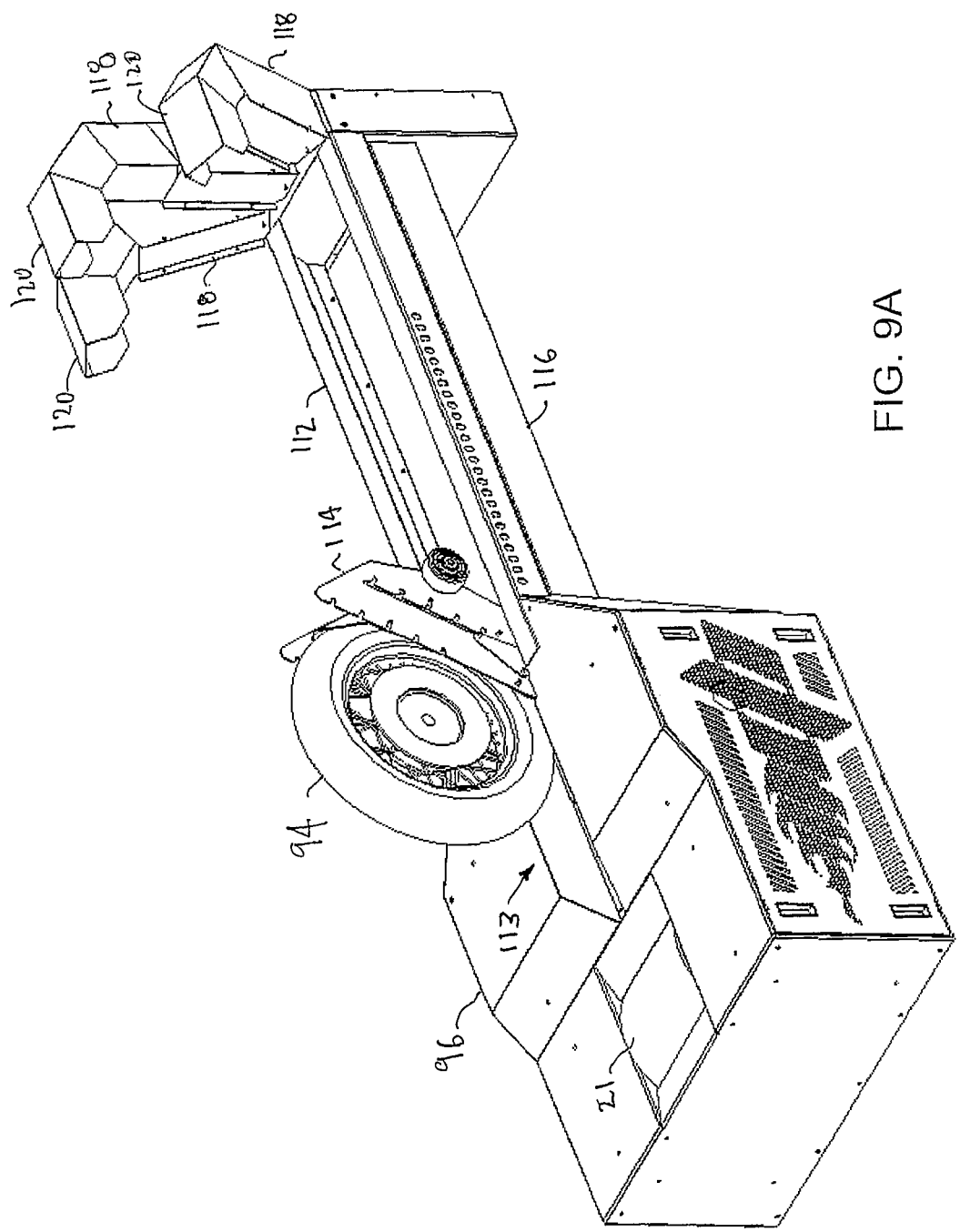
FIG. 9A is an isometric view of the dynamometer system shown in FIG. 9.

A dynamometer test system 90 that is in accordance with the invention is illustrated generally at 90 in FIG. 9. The test system 90 includes a dynamometer assembly 91 that is similar to the dynamometer 10 described above. An isometric view of the test system 90 is shown in FIG. 9A. Components shown in FIGS. 9 and 9A that are similar to components shown in the preceding drawings have the same numerical identifiers. The dynamometer test system 90 is especially suited for testing two wheeled vehicles, such as mopeds and motorcycles, and is mounted above the load supporting surface 12, thus eliminating the need for pits or chambers as utilized for the dynamometers described above. A pair of wheels, 92 and 94, is shown in phantom in FIG. 9 with the wheel 92 to the left in the figure representing the rear driven wheel of a motorcycle and the wheel 94 to the right in the figure representing the front steerable wheel. Only the front wheel 94 is shown in FIG. 9A so that a portion of the dynamometer drum 21 is visible.

Figure 10:
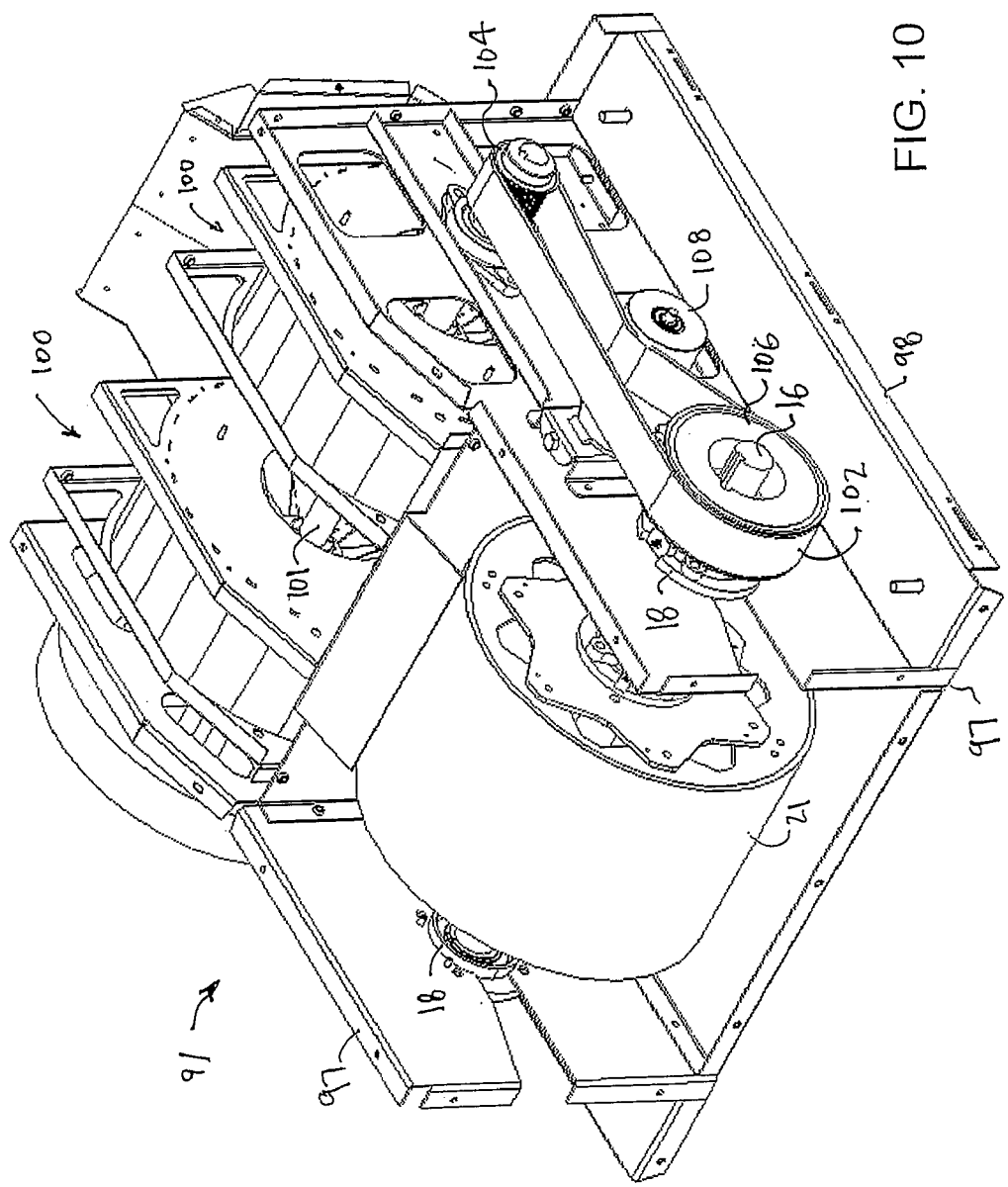
FIG. 10 is an isometric view of a portion of the dynamometer system shown in FIG. 9.
Figure 11:
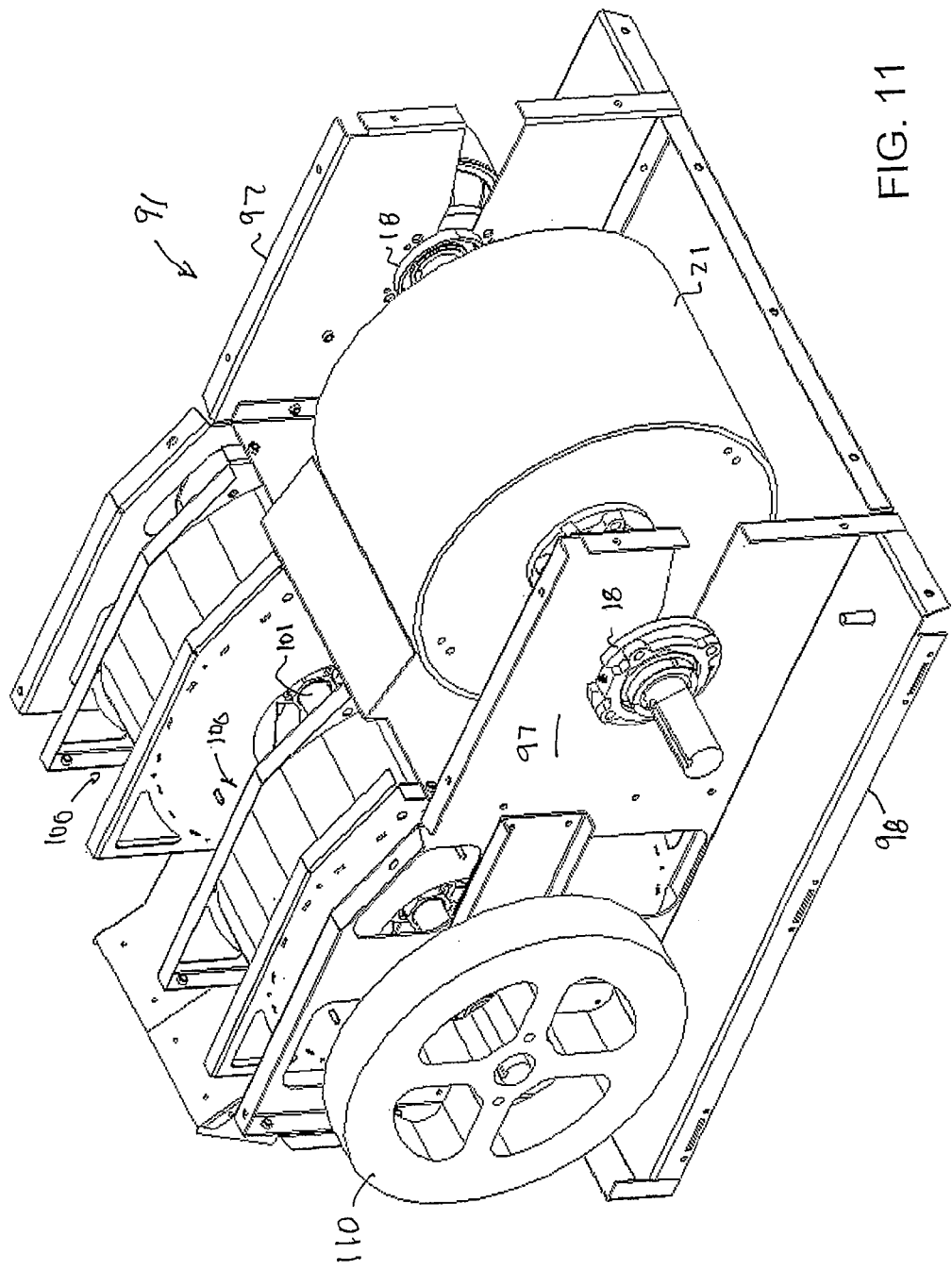
FIG. 11 is another isometric view of the portion of the system shown in FIG. 10.

The system 90 includes a housing 96 that encloses the dynamometer assembly 91. Within the housing 96, a pair of sidewalls 97 support the dynamometer drum 21, which is best illustrated in FIGS. 10 and 11, which are right and left isometric views, respectively, of the dynamometer assembly 91. As shown in FIGS. 10 and 11, the sidewalls 97 are mounted upon a housing base 96. As best seen in FIG. 11, the dynamometer outer bearings 18 are carried upon the sidewalls 97. A ramp 99 for loading the test vehicle onto the dynamometer test system 90 extends from the housing 96 to the left in FIG. 9. Again, for clarity, the ramp 99 has been omitted from FIG. 9A. As described above, the ramp 99 may be either permanently or temporarily attached to the housing 96. Preferably, the connection between the ramp 97 and the housing 96 is hinged to allow the ramp to be moved out of the way when the dynamometer test system 90 is not in use. As also described above, it is contemplated that the test system 90 may be mounted upon casters (not shown) for easy movement and storage.

The housing 96 also encloses a pair of centrifugal fans 100 that are mounted upon a common fan drive shaft 101. While a pair of fans is shown in FIGS. 10 and 11, it will be appreciated that the invention also may be practiced with more or less fans than are shown. Each of the fans 100 includes an adjustable intake aperture (not shown) with an opening that may be increased or decreased by the dynamometer controller 48 for controlling the amount of air drawn into the fan.

As shown in FIG. 10, the fan drive shaft 101 is driven by a drive belt 102 that passes around a first pulley 104 mounted upon one end of the fan drive shaft 101 and a second pulley 106 mounted upon one end of the dynamometer shaft 16. Thus, the rotating dynamometer drum 21 drives the centrifugal fans 100 at a rotational speed that is a function of the rotational speed of the dynamometer drum 21. An idler pulley assembly 108 maintains tension in the drive belt 102. It is noted that the drive belt 102 and pulleys have been omitted from FIG. 9 for clarity. The inventor has successfully utilized a pulley ration of 2.3:1 with the centrifugal fans 100 being driven at a faster rotational speed than the dynamometer drum 21; however, other pulley ratios may be utilized. While a drive belt assembly has been shown in FIG. 10, it will be appreciated that the invention also may be practiced with other methods for driving the fans 98 and the circular weight 110, such as, for example, gearing.

As best seen in FIG. 11, a circular weight 110 is mounted upon the end of the fan drive shaft 101 that is opposite from the first pulley 104. The weight 110 simulates an inertial load on the system 90 and may be easily changed to provide different loading effects. Thus, the invention contemplates substituting a weight 110 for the eddy current brake 50 described above, which simplifies the overall test system 90 by eliminating the load brake 50 shown in FIG. 5. Utilization of a separate weight 110 allows use of a lighter dynamometer drum 21. Prior art dynamometers typically used a heavy drum to simulate inertial loads. Such prior art drums were difficult to balance and unwanted vibrations would effect the accuracy of the measurements. Also, the drum weight could not be varied to simulate different loading conditions for the test vehicle. Thus, the inventor considers that the use of an inertial load weight is superior to prior art dynamometer designs. Alternately, the eddy current brake 50, of one of the other devices described above, may be used in place of, or in combination with, the weight 110. Such devices may be mounted upon the end of the fan drive shaft 101 or integrated with the dynamometer drum 21 as described above.

As shown in FIGS. 9 through 11, the utilization of the centrifugal fans 100 and inertial weight 110 replaces the conventional dynamometer loads described above. Because the centrifugal fans 100 and inertial weight 110 are mechanically driven by the dynamometer drum 21, the alternator for generating power for an eddy current brake 50 shown in FIG. 5 is not required, again resulting in simpler and less expensive dynamometer controls (not shown).

The test system 90 also includes a dynamometer track 112 that extends from the housing 96 to right in FIG. 9. The track 112 supports a wheel cradle 114 that will be described below. As best seen in FIG. 9A, a slot 113 is provided in the top surface of the housing 96 between the centrifugal fans 100. In use, a vehicle is driven up the ramp 99 extending from the housing 96 and onto the top surface of the dynamometer housing 96 and the track 112 with the front wheel 94 passing through the slot 113 to be received by the cradle 114 while the rear wheel 92 engages the dynamometer drum 21. The wheel cradle 114 is functional to retain the test vehicle in place upon the dynamometer track 112 and drum 21. The test vehicle is then started and operated with the driven rear wheel 92 rotating the dynamometer drum 21 and thus providing power to the fans 100 while also rotating the simulated inertial load 110.

A horizontal air duct 116 that extends below the dynamometer track 112 between the fans 100 and a plurality of risers 118. Each of the risers 118 terminates in an air discharge port 120 that directs the air flow toward the test vehicle. While three risers 118 and discharge ports 120 are shown in FIG. 9A, it will be appreciated that the invention also may be practiced with more or less risers and discharge ports. The fans 100 force air through the horizontal duct 116 and risers 118 for discharge from the discharge ports 120. As the speed of the vehicle increases, the velocity of the air flow increases proportionally and provides wind loading upon the test vehicle. The combination of the wind loading and the inertial load provided by the circular weight 110 provide an accurate simulation of the operation of the test vehicle upon a road even though the test vehicle is mounted upon the stationary dynamometer test system 90.

Figure 12:
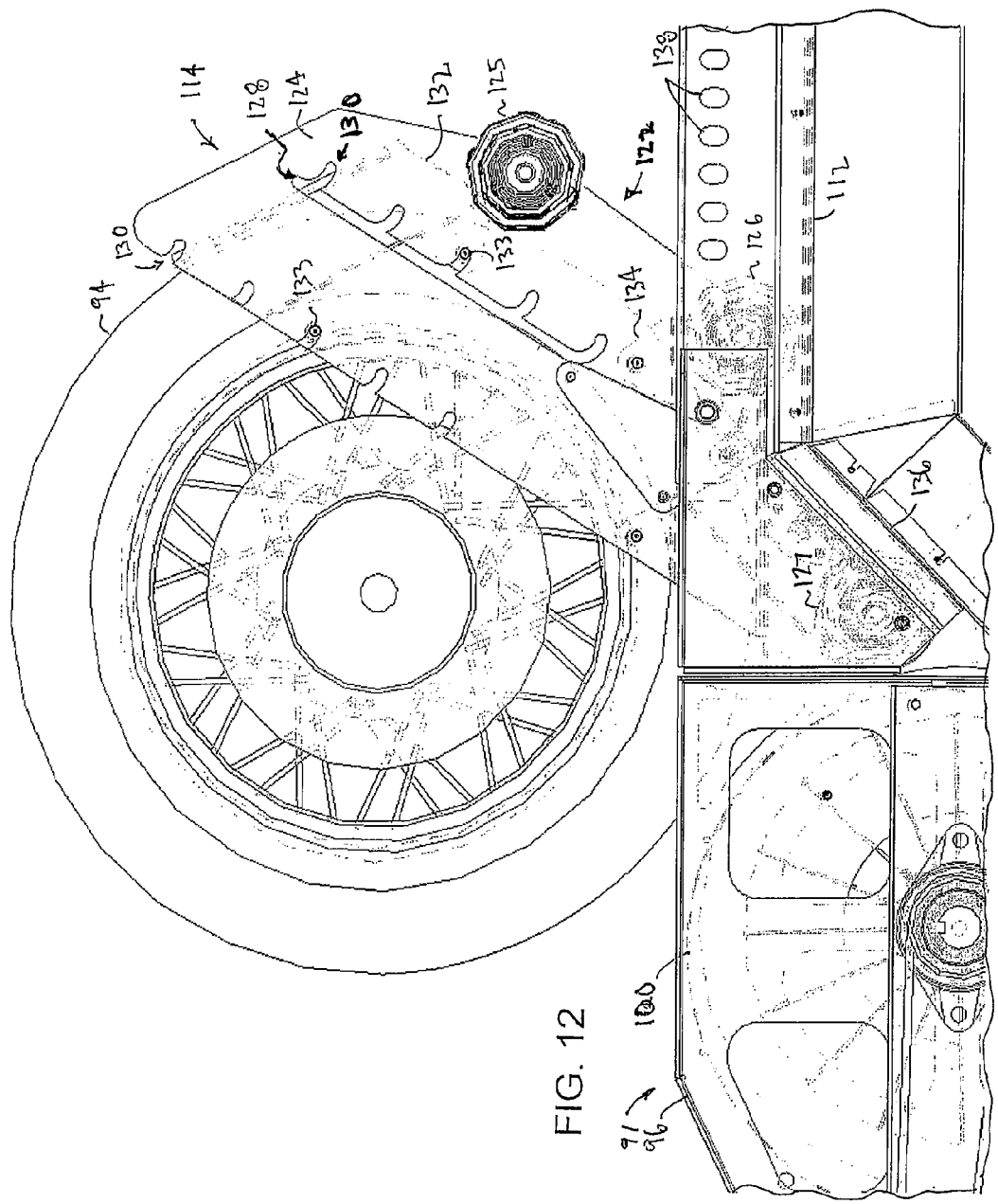
FIG. 12 is a side view of a portion of the system shown in FIG. 9 that illustrates an initial step in the loading of a test vehicle.
Figure 13:
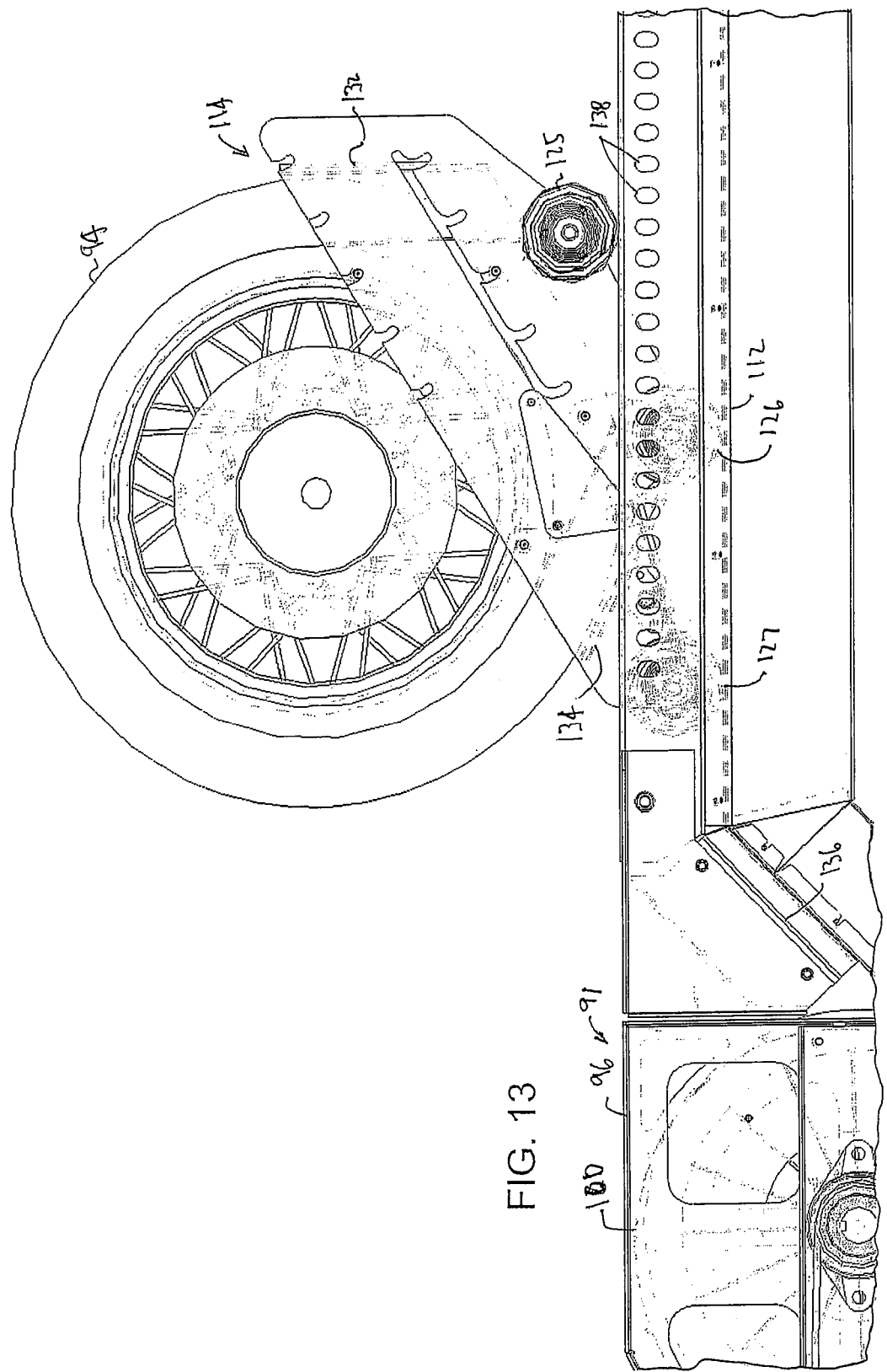
FIG. 13 illustrates a further step in the loading of the test vehicle from the step shown in FIG. 12.

As described above, the dynamometer test system 90 further includes a wheel cradle 114 that receives and retains the test vehicle front wheel 94. As best seen in FIG. 12, the cradle 114 includes a generally U-shaped housing 122 that has a pair of sides 124 and carries a plurality of rollers that are arranged in pairs with only one roller of each pair shown in FIGS. 12 and 13. A first pair of rollers that is labeled 125 is shown as being disposed at that upper end of the cradle 114 in FIG. 12. A second pair of rollers that is labeled 126 is shown as being disposed at the midpoint of the cradle 114, while a third pair of rollers that is labeled 127 is shown as being disposed at that lower end of the cradle 114 in FIG. 12. A longitudinal slot 128 extends through each of the cradle sides 124. A plurality of notches 130 are formed along the top edges of both of the cradle sides 124 and also along the bottom edges of both of the slots 128. A first end piece 132, which is shown in phantom, is disposed within the cradle housing 122 and secured by pins 133 that extend into selected ones of the notches 130 along the top edges of the cradle and along the cradle slots 128. The notches 130 allow longitudinal positioning of the first end piece 132 within the cradle housing to accommodate wheels having different diameters. As shown in FIGS. 12 and 13, the first end piece 132 closes off the end of the cradle that is furthest away from the test vehicle. A second end piece 134, which also is shown in phantom, is disposed within the cradle housing 122 at the end opposite from the first end piece 132.

As shown in FIG. 12, when the test vehicle is being loaded onto the system 90, the second end piece 134 is initially in a horizontal position and provides support as the wheel 94 is rolled into the cradle 114. As the test vehicle advances onto the dynamometer test system 90, the front wheel 94 rolls between the pair of fans 100 and engages the cradle 114, urging the first and second pair of cradle rollers 125 and 126 to roll up a ramp portion 136 of the track 112 (not shown). As the cradle 114 rolls onto the horizontal track 112 the cradle is supported by the second and third pair of rollers 126 and 127, as illustrated in FIG. 12, where the second pair of rollers 126 has rolled onto the horizontal track 112 while the third pair of rollers remain on the ramp portion 136 of the track. Finally, as the cradle 114 continues to advance onto the dynamometer track 112 to position the rear wheel 92 upon the dynamometer drum 21 (not shown), the cradle 114 rotates in a clockwise direction to be supported again by the first and second pair of rollers 125 and 126, which are now on the horizontal track. The rotation of the cradle 114 repositions the second end piece 134 as shown in FIG. 13 to function as a rear stop for the front wheel 94. Thus, the repositioned second end piece 134 holds the front wheel 94 of the test vehicle on the track 112 with the rear wheel 92 positioned upon the dynamometer drum 21. A plurality of apertures 138 formed through the sides of the dynamometer track 112 receive pins (not shown) that lock the cradle 114 in position upon the track 112 of the dynamometer system 90 once the front wheel 94 has been loaded into the cradle. By providing a plurality of apertures 138, different lengths of test vehicles may be accommodated upon the test system 90.

Figure 14:
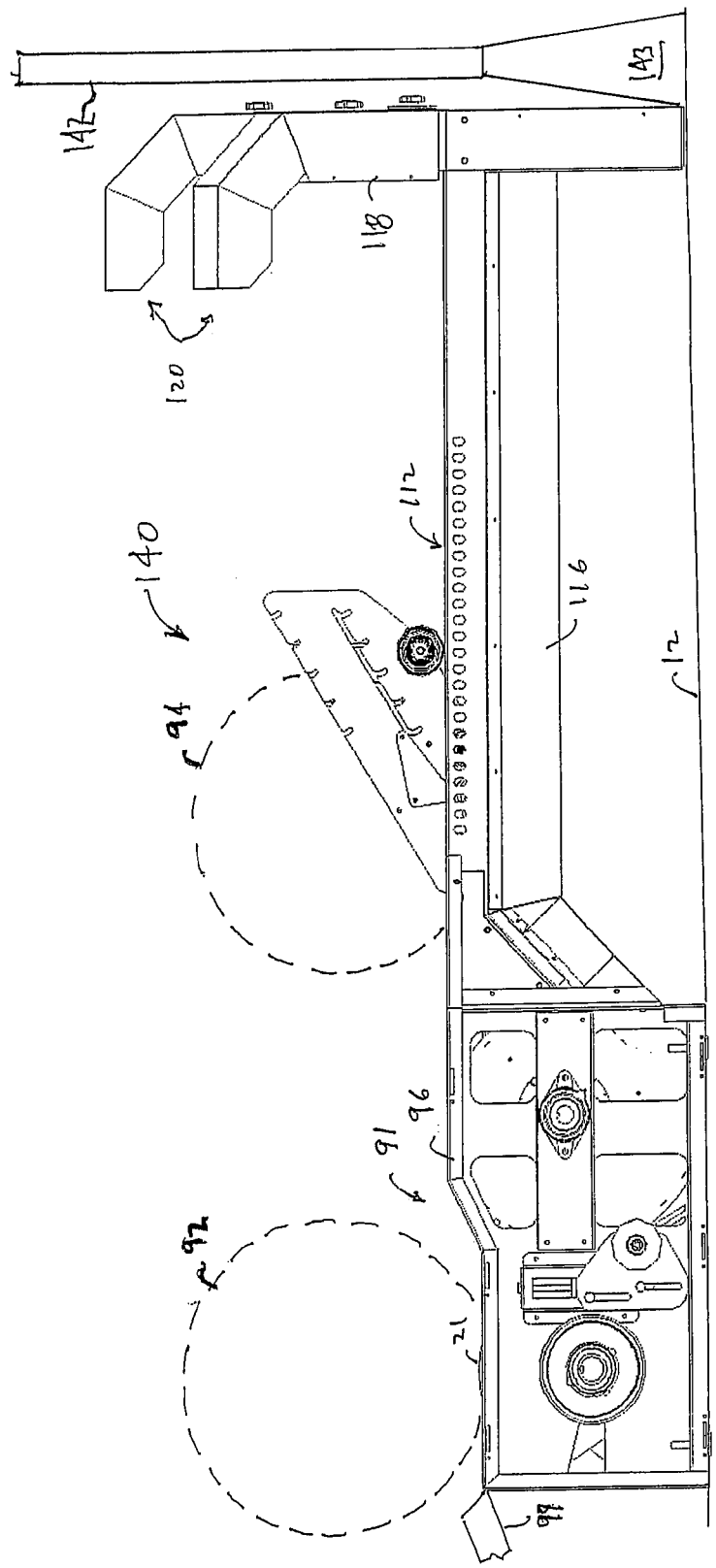
FIG. 14 illustrates an alternate embodiment of the dynamometer test system shown in FIG. 9.
Figure 15:
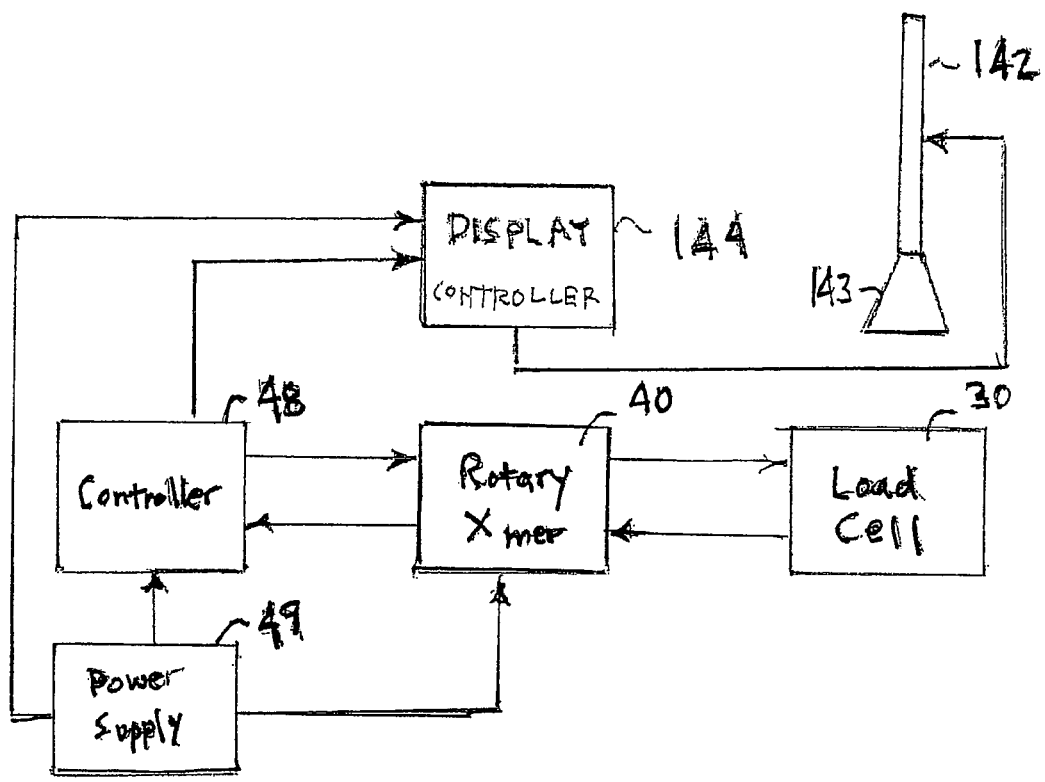
FIG. 15 is a block diagram illustrating the control of the alternate dynamometer system shown in FIG. 14.

An alternate embodiment of the dynamometer system is shown generally at 140 in FIG. 14, where components that are similar to components shown in previous drawings have the same numerical identifiers. The dynamometer 140 includes a display screen 142 supported by a base 143, the screen being placed behind the air duct risers 118 and the air discharge ports 120. The screen 142 may be a conventional large screen display panel, such as, for example, a LCD display, a plasma display screen or rear projector screen. While a self supported free standing display screen is shown in FIG. 14, the invention also contemplates mounting the display screen upon a wall in front of the dynamometer test system (not shown). In order to obtain a sufficient screen size, several conventional display screens may be arranged adjacent to one another. While a flat display screen 142 is shown in FIG. 14, it will be appreciated the invention also may be practiced with a curved display screen or a screen with side panels that extend toward the dynamometer track 112 at an angle from a central panel (not shown). The display screen 142 is connected to a display controller 144, as shown in FIG. 15. The display controller 144 is connected to the dynamometer controller 48 and the power supply 48.

The invention contemplates that the display controller 144 is operational to project an image of a road upon the display screen 142. The projected road image would be animated in co-ordination with the dynamometer drum to replicate travel of the test vehicle along the displayed road. As the test vehicle is accelerated upon the dynamometer 140, the simulated rate of travel down the projected road would also increase. Similarly, as the test vehicle is decelerated upon the dynamometer 140, the simulated rate of travel down the projected road would also decrease. The animated road image in combination with the flow of air directed toward the test vehicle would thus replicate actual operation of the test vehicle for the vehicle operator.

The invention further contemplates that road curvatures could be included in the animated image and the wheel cradle 114 modified to allow turning of the cradled wheel 94 (not shown). The display controller 144 would monitor the image and the cradled wheel position to provide a realistic driving simulation for the vehicle operator. It is believed that dynamometer system 140 may be utilized both as a device for testing vehicles and as a vehicle drive simulator at vehicle sales dealerships. A potential buyer could "test drive" a vehicle without leaving a dealership. This would be most helpful with vehicles such as motorcycles which do not lend themselves to a sales representative accompanying a potential buyer on a test drive.

Figure 16:
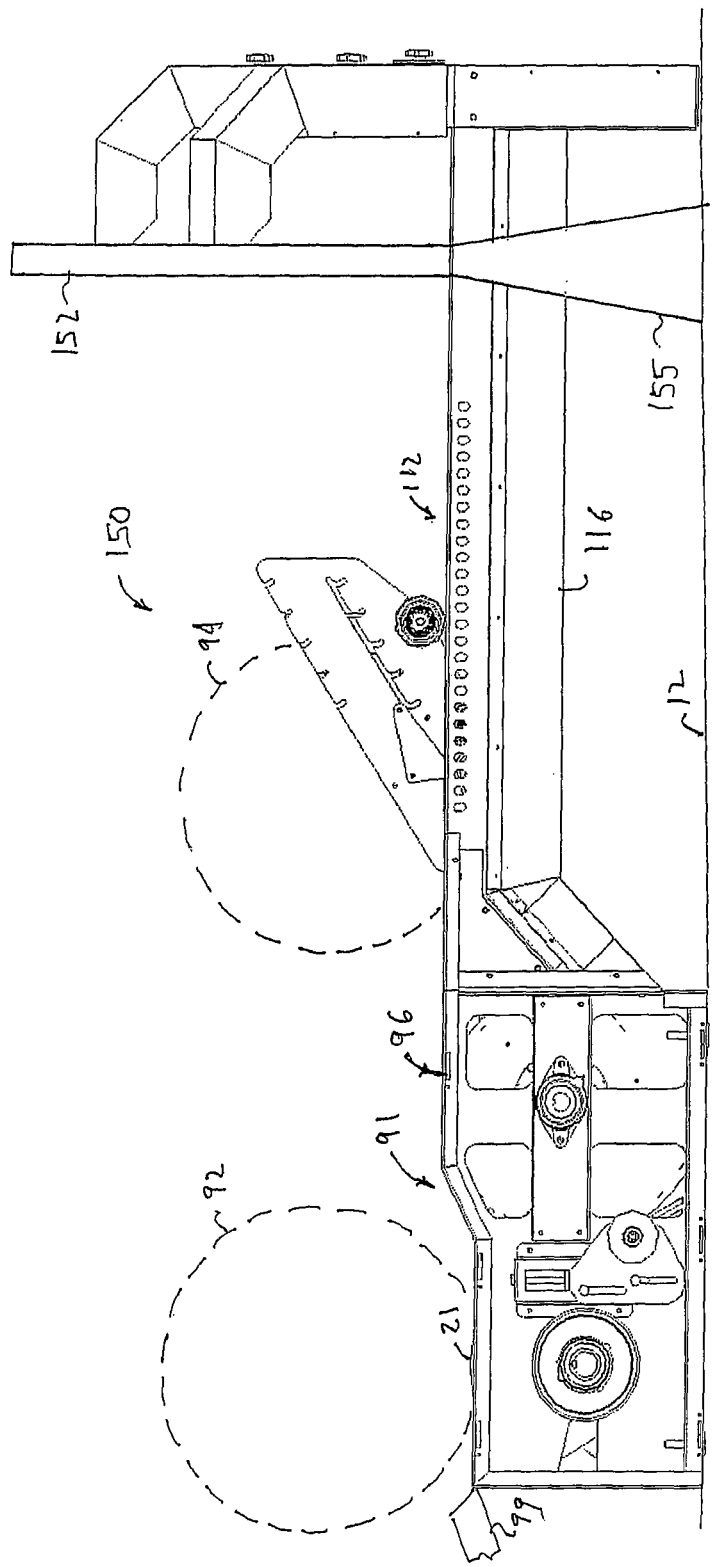
FIG. 16 illustrates another alternate embodiment of the dynamometer test system shown in FIG. 9.

Another alternate embodiment of the dynamometer system is shown generally at 150 in FIG. 16, where components that are similar to components shown in previous drawings have the same numerical identifiers. The dynamometer system 150 differs from the system 140 shown in FIG. 14 by placement of a display screen 152 supported by a base 155 in front of the vertical air duct riser 118 and the air discharge ports 120. Slots or other openings are provided through the display screen 152 (not shown) that allow the air discharged from the discharge ports 120 to be directed against the test vehicle. While a flat display screen 152 is shown in FIG. 16, it will be appreciated the invention also may be practiced with a curved display screen or a screen with side panels that extend toward the dynamometer track 112 at an angle from a central panel (not shown). By placing the display screen 152 in front of the vertical air duct riser 118 and the air discharge ports 120, the inventor believes that a more realistic simulation will be achieved.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A dynamometer comprising:
   at least one support;
   a roller shaft rotatably mounted upon said support;
   at least one hollow annular roller rotatably mounted upon and supported by said roller shaft with said roller capable of turning freely about said roller shaft, said support carrying the entire weight of said roller and said roller shaft;
   at least one load cell disposed within said roller, said load cell having a first end secured adjacent to an inner surface of said roller and a second end attached to said roller shaft; and
   at least one rotatable load driven by said roller shaft, said load operative to cause said load cell to generate a signal that is exclusively a function of torque applied to said roller.

2. The dynamometer according to claim 1 wherein said load cell is a first shear beam load cell and further wherein the dynamometer includes a second shear beam load cell, with both of said shear beam load cells having a first end secured adjacent to an inner surface of said roller and a second end attached to said shaft, said first and second load cells being spaced apart by 180 degrees and providing the only structural connections between said roller and said shaft.

3. The dynamometer according to claim 1 wherein said load cell is a shear beam load cell having a first end secured adjacent to an inner surface of said roller and a second end attached to said shaft and a counterbalance attached to at least one of said roller shaft and said roller, said counterbalance being spaced apart from said shear bean load cell by 180 degrees.

4. The dynamometer according to claim 1 wherein said rotatable load includes an eddy current brake that is coupled to said roller shaft, said eddy current brake being operable to apply a restraining force upon said roller shaft.

5. The dynamometer according to claim 4 wherein the dynamometer also includes a rotary transformer and a dynamometer controller, said rotary transformer having a rotating member attached to said roller and a stationary member attached to said support, said rotary transformer operative to transmit the signal generated by said shear beam load cell to said dynamometer controllers and further wherein said dynamometer controller is connected to said eddy current brake, said dynamometer controller operative to change said restraining force applied to said roller shaft.

6. The dynamometer according to claim 1 wherein said rotatable load also includes at least one fan driven by said roller, said fan connected to duct work that directs air from said fan against a test vehicle mounted upon the dynamometer such that the air provides a dynamic loading upon the test vehicle.

7. The dynamometer according to claim 6 wherein said fan includes an air inlet aperture having a variable opening to control the volume of air supplied to said fan.

8. The dynamometer according to claim 6 wherein said rotatable load also includes a circular weight driven by said roller, said rotatable load providing an inertial loading to the test vehicle.

9. The dynamometer according to claim 8 wherein said fan includes a fan shaft and further wherein said rotatable load is removably attached to said fan shaft.

10. The dynamometer according to claim 1 also including a rotary transformer and a dynamometer controller, said rotary transformer having a rotating member attached to said roller and a stationary member attached to said support, said rotary transformer operative to transmit the signal generated by said shear beam load cell to said dynamometer controller.

11. The dynamometer according to claim 10 wherein said rotary transformer also is operable to transmit power to said load cell.

12. The dynamometer according to claim 10 also including a rotary speed encoder having a rotating member attached to said roller and a stationary member attached to said support, said rotary speed encoder operative to generate a fluctuating signal that is a function of the rotational speed of said roller.

13. The dynamometer according to claim 10 wherein said roller is journaled upon said shaft by at least one bearing and further wherein said shaft is journaled upon said support by at least one bearing.

14. The dynamometer according to claim 10 further including a display screen placed adjacent to the dynamometer, said display screen in communication with said dynamometer controller, said dynamometer controller operative to present an animated display upon said display screen to simulate a road upon which a test vehicle is moving, said display synchronized with the rotational speed of said roller such that the speed of changes in said display is related to the roller rotational speed.

15. The dynamometer according to claim 10 wherein said controller is further operable to convert signals received from said load cell into dynamometer output data.

16. The dynamometer according to claim 15 wherein said controller includes a display for displaying said dynamometer output data.

17. The dynamometer according to claim 15 wherein said controller includes a memory device for storing said dynamometer output data.

18. The dynamometer according to claim 10 further including a housing in which said roller and support are disposed, said housing having an opening formed therein though which said roller extends, said housing also including a ramp adapted for loading a driven vehicle wheel upon said roller.

19. The dynamometer according to claim 18 wherein said housing is mounted upon a plurality of casters and said ramp is hinged, said casters and said hinged ramp providing mobility for the dynamometer.

20. The dynamometer according to claim 18 further including a track attached to said housing, said track carrying a cradle, said cradle receiving a non-driven wheel of the test vehicle and being operable to retain said non-driven vehicle wheel and the test vehicle upon the dynamometer.

* * * * *